(12) United States Patent
VanDyke, Jr.

(10) Patent No.: US 7,399,147 B1
(45) Date of Patent: Jul. 15, 2008

(54) END MILL BIT WITH NOTCHED TEETH

(76) Inventor: Daryl C. VanDyke, Jr., 11312 Sunrise Gold Cir., Rancho Cordova, CA (US) 95742

( * ) Notice: Subject to any disclaimer, the term of this patent is extended or adjusted under 35 U.S.C. 154(b) by 0 days.

(21) Appl. No.: 11/200,974

(22) Filed: Aug. 9, 2005

(51) Int. Cl.
*B23C 5/10* (2006.01)
*B23C 1/10* (2006.01)

(52) U.S. Cl. .......................................... 407/53; 407/59

(58) Field of Classification Search .................. 407/53, 407/54, 59, 64, 65
See application file for complete search history.

(56) References Cited

U.S. PATENT DOCUMENTS

| | | | |
|---|---|---|---|
| 4,212,568 A | * | 7/1980 | Minicozzi .................... 407/53 |
| 4,497,600 A | * | 2/1985 | Kishimoto .................... 407/53 |
| 4,810,136 A | * | 3/1989 | Paige ............................ 407/54 |
| 6,164,876 A | * | 12/2000 | Cordovano .................... 407/59 |

OTHER PUBLICATIONS

Iscar Metals, Inc.; Iscar Cutting Tools; Finishred Endmill; www.iscar.com.

* cited by examiner

*Primary Examiner*—Willmon Fridie
(74) *Attorney, Agent, or Firm*—Heisler & Associates

(57) ABSTRACT

An end mill is provided with a plurality of teeth extending helically therealong, and with the teeth notched. The notches interrupt the cutting edge of the teeth at various different positions between a tip of the tooth and a root of the tooth. Various different patterns of notches are disclosed with each notch beneficially followed by a region on a following tooth which is notchless. The notches interrupt an otherwise flat cutting edge so that a smooth cut into the work piece is provided by portions of the cutting edge between the notches, and by regions on the teeth where no notches are provided.

21 Claims, 2 Drawing Sheets

END MILL BIT WITH NOTCHED TEETH

FIELD OF THE INVENTION

The following invention relates to rotating cutting tools, and especially to end mills such as those utilized by milling machines. More particularly, this invention relates to end mills and other cutting tools which have notches formed in the cutting edges thereof, such as to minimize vibration.

BACKGROUND OF THE INVENTION

End mills are tools which are configured to be coupled to a rotating drive of a milling machine for utilization in cutting a work piece with the milling machine. End mills come in a variety of different configurations depending on the material to be cut and other factors such as the shape of cut to be made and whether the work piece is to be rough cut or cut to precise finish dimensions.

Typical end mills have a generally cylindrical form with a shank at one end adapted to be attached to the rotating support of the milling machine and a tip opposite the shank. A series of flutes are cut helically from the tip of the end mill to a midpoint of the end mill where the shank begins. Between the flutes cutting teeth are provided. These teeth have a sharpened cutting edge on a leading side thereof and a heel on a trailing side thereof. Typically, a land exists between the cutting edge and the heel.

This cutting edge of each tooth acts to cut into the work piece when the end mill is traveling laterally and spinning. The tip of the end mill also typically includes sharpened tip cutting edges so that the end mill can also cut the work piece when the end mill is moving axially into the work piece. The specific contours of the tip and cutting edges of the end mill can be configured in many different ways depending on the particular material to be cut and other desired performance characteristics. For instance, the helical angle of the flutes and teeth can vary, the number of flutes and teeth can vary, and other factors such as a degree of radial rake, the degree of relief behind the cutting edge, and particular geometry of the end cutting edges including the various clearance angles, dish angles, axial rake angle, and gash angle can all be particularly selected based on the desired performance for the particular end mill.

One factor influencing the quality of cut made by an end mill on a work piece is the presence of vibration. Vibration between the end mill and work piece can cause the end mill to become prematurely worn or broken, can require slowing of the milling operation, can result in off tolerance cutting of the work piece, as well as other potentially undesirable consequences. Vibration frequencies and amplitude are controlled by many different factors including the rate at which the end mill is spinning, the rate at which the end mill is translating, both laterally and axially, the size of the end mill (i.e. the diameter) and the number of teeth on the end mill. Also, the material from which the end mill is formed and the material making up the work piece can influence the frequency and amplitude of vibration, as well as other factors.

It is known in the prior art to minimize such undesirable vibration by contouring the cutting edges of the teeth on the end mill to undulate. These cutting edges are typically provided in a sinusoidal undulating pattern from the tip to the root of each tooth along the land surface between the cutting edge and the heel of each tooth. This contouring also tends to decrease the chip size produced when the end mill cuts the work piece. With the chip sizes being somewhat randomized and decreased in size, the potential for vibration is minimized. These prior art end mills are referred to as roughing end mills because they do not provide a smooth finish cut.

Such roughing end mills can be passed more quickly through the work piece than finish end mills, without as great of concern for vibration. However, roughing end mills are not typically sufficient when a smooth and precise finish contour for the work piece is required. Rather, the roughing end mill leaves the cut surfaces of the work piece rough in form. One attempt to combine the low vibration attributes of a roughing end mill with the smooth and precise finish of an unnotched end mill has been disclosed by Iscar Metals, Inc. of Arlington, Tex. One such combination roughing and finishing end mill is marketed by Iscar Metals, Inc. under the trademark "FIN-ISHRED." With this prior art end mill, some of the teeth have an undulating sinusoidal cutting edge. Other cutting teeth have a smooth cutting edge. The smooth cutting edge and undulating cutting edge are provided in an alternating pattern. While such a combination roughing and finishing end mill exhibits a degree of effectiveness in reducing vibration and improving finish appearance of the work piece, the results are not entirely satisfactory. Rather, some vibration still is provided and the surface of the work piece is typically not as smooth as would be the case with a smooth cutting edge finishing end mill. Also, such an alternating undulating and smooth cutting edge end mill is only possible when an even number of teeth are provided on the end mill. Many end mills beneficially have an odd number of teeth (i.e. three or five, etc.) and so cannot have such an alternating pattern without some discontinuity in the pattern.

Accordingly, a need exists for an end mill which can very quickly and very precisely cut through a work piece with minimal vibration. Such an end mill is disclosed hereinbelow.

SUMMARY OF THE INVENTION

With this invention, an end mill is provided which exhibits low vibration while achieving a smooth and precise cut on a work piece. The end mill includes a plurality of teeth extending helically from a shank to a tip. Each tooth includes a cutting edge on a leading side thereof. Each cutting edge has at least one portion thereof which is notched and at least one portion thereof which is unnotched. Adjacent teeth do not have the same pattern of notched portions and unnotched portions. Rather, the teeth come with different patterns so that when the work piece experiences a notched portion of one of the teeth, the next tooth to pass that portion of the work piece is unnotched. Furthermore, in embodiments of this end mill where four or more teeth are provided, if notched portions of one tooth are a similar distance from an end of the end mill as notched portions of another non-adjacent tooth, the notches are still located in a slightly different location, so that typically two or more cutting teeth portions without notches pass by each portion of the work piece which has been passed by a notched portion of a previous tooth, so that a high degree of finishing with unnotched cutting edges occurs for all of the different portions of the work piece.

The notches provided according to a preferred embodiment of this invention are not sinusoidal as with roughing end mills. Rather, the cutting edges have spaces between the notches which are smooth and flat in an axial direction, rather than sinusoidal as the cutting edges extend helically. Only where the notch exists is this flat portion of the cutting edge disturbed. Additionally, each notch includes a floor and side edges with the side edges being distinct from each other. In particular, one of these side edges is preferably a gradually curving side edge with the other side edge being more abrupt.

With the end mill of this invention, the cutting edges of the end mill are similar to those of a finishing end mill, except at the precise locations where the notches are provided. Each of these notched locations is then followed as the end mill turns by typically two or more following cutting edges which are not notched. With this end mill, sufficient notching exists to disrupt vibration which might otherwise occur with the end mill. However, the high percentage of finished smooth cutting edges, as well as the positioning of the notches, causes the work piece to be cut with a high degree of precision and with a high quality surface finish.

OBJECTS OF THE INVENTION

Accordingly, a primary object of the present invention is to provide an end mill which can quickly provide a precise cut in a work piece with a relatively low amount of stress on the end mill, milling machine or work piece.

Another object of the present invention is to provide an end mill which exhibits long life and reliable operation.

Another object of the present invention is to provide an end mill which exhibits minimal vibration when cutting through a work piece.

Another object of the present invention is to provide an end mill which can cut through a work piece quickly and precisely.

Another object of the present invention is to provide an end mill which minimizes the need for multiple separate tools to be utilized to produce a cut in a work piece precisely where desired with a smooth finish surface.

Another object of the present invention is to provide a rotating cutting tool which has notches in cutting edges thereof to minimize vibration experienced by the cutting tool.

Other further objects of the present invention will become apparent from a careful reading of the included drawing figures, the claims and detailed description of the invention.

DESCRIPTION OF THE PREFERRED EMBODIMENT

Figure 3:
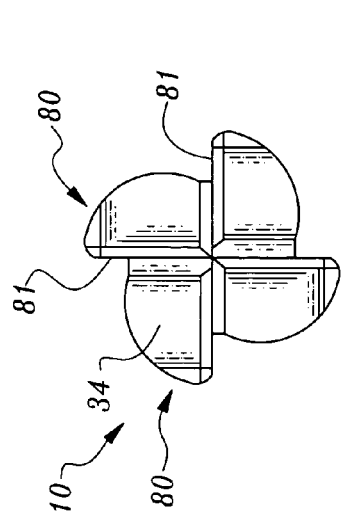
FIG. 3 is an end elevation view of that which is shown in FIG. 1.

Referring to the drawings, wherein like reference numerals represent like parts throughout the various drawing figures, reference numeral 10 (FIGS. 1-3) is directed to an end mill illustrating this invention according to a preferred embodiment. This end mill 10 is particularly configured to cut a work piece with a minimum of vibration, by including notches, referred to as knuckles 70, in the cutting edge 40 of portions of a majority, and preferably all, of the teeth 30 of the end mill 10. The end mill 10 can thus travel quickly and precisely through a work piece with a minimum of vibration and producing a smooth and precise cut.

Figure 1:
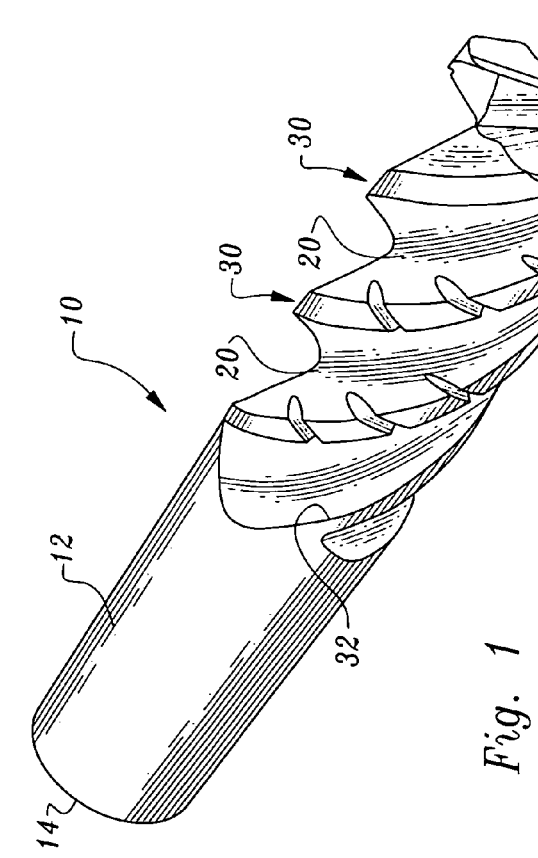
FIG. 1 is a perspective view of a preferred embodiment of the end mill of this invention.
Figure 2:
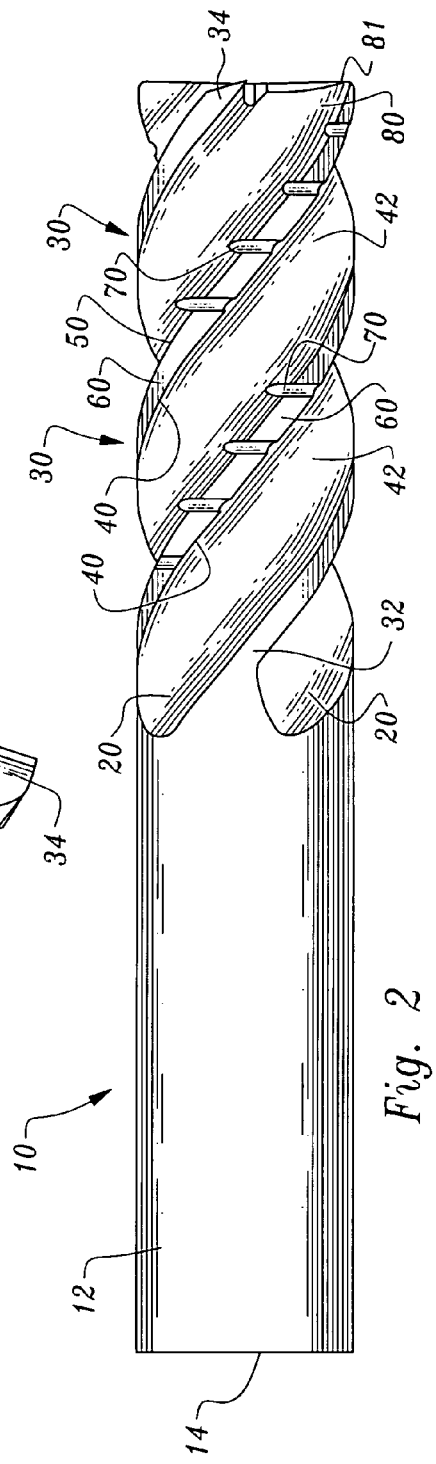
FIG. 2 is a side elevation view of that which is shown in FIG. 1.
Figure 5:
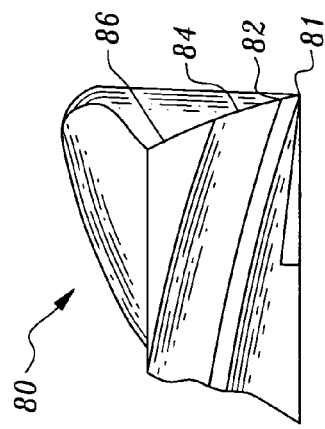
FIG. 5 is a detail of a portion of an end of that which is shown in FIG. 1.

In essence, and with particular reference to FIGS. 1-3, basic details of the end mill 10, according to this preferred embodiment, are described. The end mill 10 is formed with a plurality of flutes 20 extending helically along a long axis of the end mill 10 so that the flutes 20 separate adjacent teeth 30 of the end mill 10. Each tooth 30 includes a cutting edge 40 on a leading edge thereof. A heel 50 is provided on a trailing side of each tooth 30. Land 60 is provided between the cutting edge 40 and the heel 50, the land 60 generally defining a most radially outward portion of the end mill 10.

Knuckles 70 are formed in the cutting edge 40, and preferably across the land 60 to the heel 50. These knuckles 70 are preferably provided in a particular pattern (FIG. 4), including regions where knuckles 70 are provided and regions on each of the teeth 30 where no knuckles 70 are provided. End teeth 80 are provided at a free end of the end mill 10, so that the end mill 10 can preferably cut both in an axial direction and in a lateral direction (or combinations of both).

More specifically, and with particular reference to FIGS. 1-3, details of the general configuration of the end mill 10 of the preferred embodiment, are described. The end mill 10 is formed of a unitary mass of hard strong material, such as carbide or other tool steel. The contours of the end mill 10 are typically formed by various grinding instruments as is well known in the tool manufacturing arts.

The end mill 10 preferably includes a shank 12 at an attached end 14 of the end mill 10. This shank 12 can either be cylindrical or faceted, with the shank 12 particularly configured so that it is adapted to be attached to a rotating support. Such a rotating support would typically be a chuck of a milling machine. Alternatively, the end mill 10 could be in the form of some other form of rotating cutting tool adapted to be attached to some other form of rotating support, such as a drill bit for attachment to a drill press or other drill. The shank 12 preferably makes up approximately half of an overall length of the end mill 10 from the attached end 14 to a tip 34 of the teeth 30 of the end mill 10. However, it is only strictly necessary that the shank 12 be sufficiently long to provide sufficient surface area for supporting the end mill 10 within the rotating support.

The flutes 20 are typically formed into the end mill 10 so that the flutes 20 act as helical troughs extending at a helix angle from the tip 34 up to a root 32 of each of the teeth 30. Cutting of the flutes 20 into the end mill 10 also results in the forming of the teeth 30 between each of the flutes 20. The number of flutes 20 can vary, but would typically be between three and five for most end mill applications. It is conceivable that an end mill 10 could be formed with only two flutes 20 and two teeth 30, or for the end mill 10 to have a number of flutes 20 and associated teeth 30 higher than five, depending on the particular design criteria and application for use of the end mill 10.

The teeth 30 extend from the root 32 adjacent the shank 12 down to the tip 34. The teeth 30 generally have a form defined as a crest between adjacent troughs formed by the adjacent flutes 20. The teeth 30 thus extend helically from the root 32 to the tip 34 at a helix angle similar to that of the flutes 20.

Each tooth 30 preferably has a cutting edge 40 on a leading edge of each tooth 30. This leading edge is that side of the tooth 30 which is oriented on the side of the tooth 30 in the direction of rotational travel of the end mill 10 when it is rotating due to torque applied to the end mill 10 by the rotating support. This cutting edge 40 is the portion of each tooth 30 which impacts the work piece to cut material from the work piece during a milling procedure. The cutting edge 40 includes a face 42 extending down from the cutting edge 40.

Each tooth 30 preferably has a heel 50 on a trailing side of each tooth 30, and opposite each cutting edge 40. Land 60 is provided between the cutting edge 40 and heel 50. This land 60 has a width defining a thickness of each tooth 30 at a radial crest of each tooth 30. Typically, relief is cut into a rear side of the cutting edge 40 so that only a very tip of the cutting edge 40 impacts the work piece. Directly behind the cutting edge 40, this relief cut (or most typically primary and second relief cuts, or some form of curving relief cut with a radius of curvature greater than that of the overall end mill 10) is provided so that after the cutting edge 40 passes through the work piece, portions of each tooth 30 behind the cutting edge 40 do not impact the work piece. Rather, it is desirable that only the cutting edges 40 of each of the teeth 30 of the end mill 10 impact the work piece to cut material from the work piece. Thus, the land 60 has typically different facets or a curving surface trailing behind the cutting edge 40 which is somewhat complex in form. However, as the land 60 extends helically from the root 32 of each tooth 30 to the tip 34 of each tooth 30, the land 60 is preferably substantially smooth, so that a smooth cut can be formed into the work piece.

With this particular invention, the cutting edge 40 is interrupted at various different locations on various ones of the teeth 30 with knuckles 70. These knuckles 70 are notches (FIG. 6) extending circumferentially the thickness of the tooth 30 and extending radially inwardly from a tip of the cutting edge 40 toward a central axis of the end mill 10. The knuckles 70 preferably extend through both the cutting edge 70 and the heel 50, as well as all the way through the land 60 between the cutting edge 40 and heel 50. These knuckles 70 reduce vibration and act as chip breakers to reduce chip size and enhance performance of the end mill 10 according to this invention.

Figure 6:
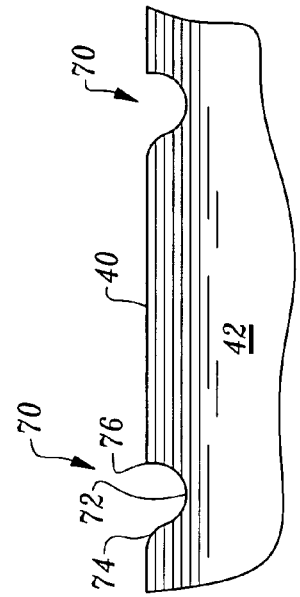
FIG. 6 is a detail of a portion of that which is shown in FIG. 4 and revealing a particular contour of notches formed in the cutting edges of the teeth of the end mill of the preferred embodiment of this invention.

Each knuckle 70 preferably includes a floor 72 bordered by a curving edge 74 on a first side of the floor 72 and an abrupt edge 76 on a second side of the floor 72. The curving edge 74 is preferably on a side of each knuckle 70 most distant from the tip 34. The abrupt edge 76 is preferably on a side of the floor 72 closest to the tip 34. The abrupt edge 76 forms preferably substantially a 90° angle with the surface of the cutting edge 40 between adjacent knuckles 70. The curving edge 74 preferably has a gradual radius of curvature similar to that of the floor 72 of the knuckles 70. This floor 72 is preferably not flat, but rather curves continuously. Alternatively, the knuckles 70 could have a faceted form and could either be symmetrical about a center of each knuckle 70 or non-symmetrical (as shown in FIG. 6 and according to the preferred embodiment).

Figure 4:
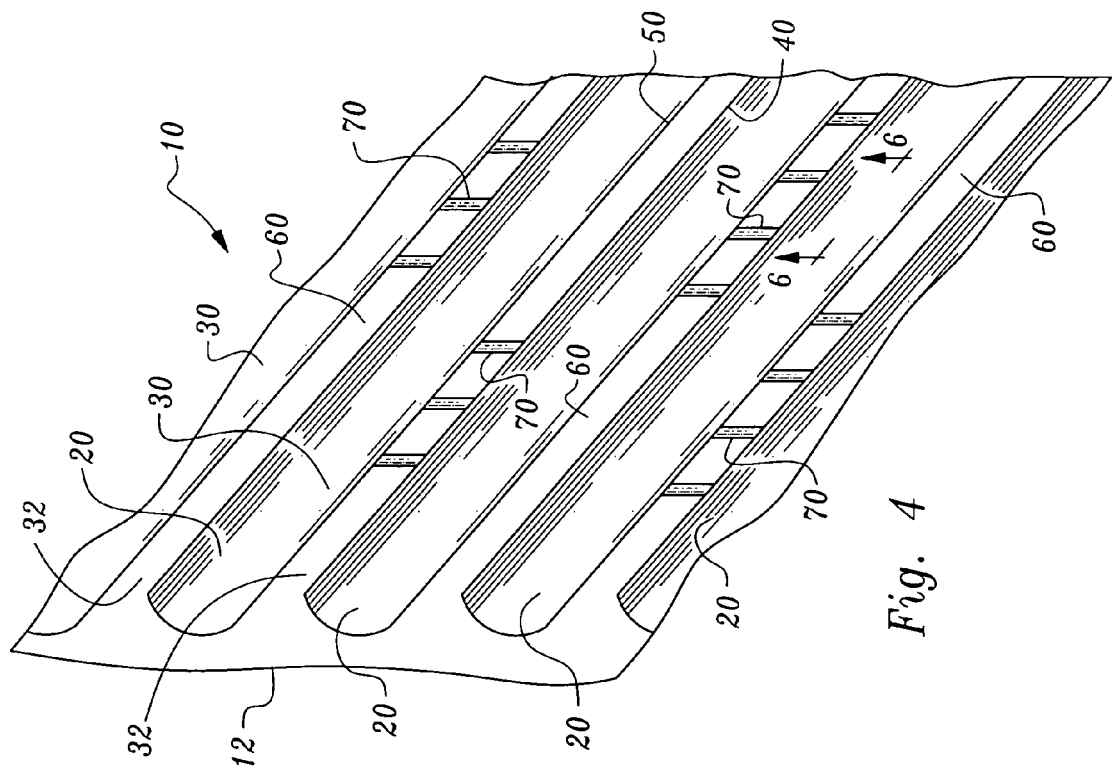
FIG. 4 is a cylindrical projection of a portion of that which is shown in FIG. 1.

The knuckles 70 are preferably provided in a particular pattern (FIG. 4). In particular, the knuckles 70 or other notches are grouped into regions so that preferably each of the teeth 30 has at least one knuckle 70 thereon, and preferably a plurality of knuckles thereon. However, none of the teeth 30 have knuckles 70 along an entire cutting edge 40 thereof. Rather, each of the teeth 30 has at least one region with knuckles 70 thereon and at least one region which is notchless. In the preferred embodiment, the end mill 10 is shown with four teeth 30. Each tooth 30 has a region with knuckles 70 and a region without knuckles 70. Two of the teeth 30 have the regions with knuckles 70 closer to the tip 34 and two of the teeth 30 have the regions with knuckles 70 closer to the root 32. These pairs of teeth 30 are provided in an alternating pattern so that each region with knuckles 70 is followed by the next tooth 30 with a notchless region on the next following tooth 30. In this way, the chip breaker knuckle 70 leaves the work piece with a small knob resulting from the knuckle 70 formed in the tooth 30. However, when the next tooth 30 impacts that same region of the work piece, a notchless region is presented so that any knob or other imperfection left on the work piece is cut away leaving the work piece substantially smooth.

In addition, the particular positioning of the knuckles 70 are provided so that preferably even when regions on the teeth 30 which include knuckles 70 strike the work piece, the knuckles 70 on the other teeth 30 that follow are provided out of alignment with knuckles 70 of preceding teeth, so that the work piece is subsequently struck with a notchless portion of the cutting edge 40.

In particular, and as particularly shown in FIG. 4, a first tooth (viewed from the top of FIG. 4) has a first notch region with three knuckles 70 provided close to the tip 34, and with a notchless region closer to the root 32. The second tooth 30 (from the top of FIG. 4) shows a notchless region closer to the tip 34 and a set of three knuckles 70 closer to the root 32. The third tooth 30 (from the top on FIG. 4) has a set of four knuckles 70 close to the tip 34 with the root of this third tooth 30 being notchless. The fourth tooth 30 has a portion thereof closest to the tip 34 being notchless and a portion of the fourth tooth closest to the root 32 including a set of four knuckles 70. This pattern then repeats with the first tooth 30 at the top of FIG. 4.

Note that the set of three knuckles 70 in the first tooth 30 are not aligned vertically (as shown in FIG. 4) with the set of four knuckles 70 on the third tooth 30 of FIG. 4. Rather, each knuckle 70 on the first tooth is aligned with a space between adjacent knuckles 70 on the third tooth 30. Thus, when the work piece has a knuckle 70 impact thereon, that same location will then be passed by three successive teeth 30 with two of those three teeth impacting at a notchless region and the other tooth impacting within a notched region, but without a knuckle 70 precisely aligned with where the knuckle 70 of the first tooth had previously impacted the work piece. Hence, three teeth are available to finish any roughness which might result from the knuckle 70. In this way, vibration is minimized without sacrificing finish quality on the work piece.

The end mill 10 terminates with a plurality of end teeth 80 at the ends of each of the teeth 30. These end teeth 80 allow the end mill 10 to move axially into the work piece. Each end tooth 80 preferably includes an end cutting edge 81 which is followed by a primary clearance angle 82, a secondary clearance angle 84 and a gash angle 86. These angles together allow the end tooth 80 to function as desired.

While the particular pattern for knuckles 70 shown in FIG. 4 is effective to produce the desired results according to this invention, various different patterns of knuckles 70 or other notches could alternatively be provided according to this invention. For instance, if the end mill 10 were to include three teeth, it would be conceivable that two of the teeth would include knuckles 70 thereon and the third tooth would be completely notchless. Also, it is conceivable that the knuckles 70 could be provided in different regions on each of the three teeth, such as with one of the teeth having the knuckles 70 grouped closest to the tip 34, another of the teeth 30 having the knuckles 70 grouped in a midpoint of the second tooth 30 between the tip 34 and root 32, and with a third of the teeth 30 having knuckles 70 grouped closer to the root 32 of the third tooth 30. Similarly, with other odd numbers of teeth 30, more than two different groups of knuckles 70 can be provided, or notchless teeth 30 can be provided.

Also, it is conceivable that an end mill could be provided according to this invention which would include knuckles 70 substantially along an entire length of each of the teeth 30, but with each of the knuckles 70 followed by a next one or more cutting edges of the following teeth 30 which also have knuckles 70, but not located precisely where previous knuckles 70 are located. Because the knuckles 70 are spaced apart by a substantially flat cutting edge, a smooth cut is provided into the work piece, even if only one smooth cutting edge 40 impacts the work piece after a knuckle 70. Also, the particular knuckle 70 configuration with the curving edge 74 and abrupt edge 76 could conceivably be utilized with end mills with notches having different patterns than those particularly disclosed herein according to this invention, including as a substitute for undulating cutting edges on roughing end mills.

While the end mill 10 of this invention is preferably in the form of an end mill 10 for use with a milling machine, other rotating cutters could also be modified according to this invention to include notches in the teeth thereof to beneficially reduce vibration and otherwise improve a speed and quality with which cutting of a work piece can occur. For instance, a drill bit could be so modified according to this invention.

While the specific dimensions of the various different facets of the end mill 10 according to the preferred embodiment can vary to match those of end mills known in the prior art, at least one form of end mill 10 according to this invention can include the following specific detailed description in an exemplary example:

Example 1, a four flute, helical, solid carbide, harmonic reducing, end mill.

Basic End Mill Geometry:
Flute Geometry:
1. 40° helical flutes.
2. 10° radial rake.
3. 60% core diameter.
4. 16% circular margin (finish flute land width).
Outer Diameter Geometry:
1. Eccentric (radial) relief clearance angle: 6°.
2. Full eccentric (radial) relief (no secondary clearance angle).
End Teeth Geometry:
1. Two center (long) cutting teeth. The center cutting teeth are opposing, 180° apart.
2. Two non-center (short) cutting teeth, perpendicular to the long teeth. The non-center cutting teeth are opposing, 180° apart.
3. Gash angle, on both center and non-center cutting teeth, 30° relative to the end of the end mill.
4. End cutting relief consists of the following:
Primary clearance angle: 7°.
Primary land width: Actual land width size is determined proportionally by the diameter size of the end mill.
Secondary clearance angle: 17°.
Axial rake angle: Produced by the end teeth gash, for both center and non-center cutting teeth. The axial rake angle is a positive 4° relative to the centerline of the end mill.
Dish angle: For both center and non-center cutting teeth, 2°.
Rougher-Finisher Knuckle (Chipbreaker) Geometry:
1. The rougher-finisher knuckle form is as follows:
knuckle width, 0.030 inch.
knuckle radius, 0.015 inch.
knuckle depth, from the cutter outer diameter (OD), 0.020 inch.
2. The rougher-finisher knuckle pitch, (the distance from one knuckle to the next on the same flute in a straight line), 0.135 inch.
3. The rougher-finisher knuckle pattern is as follows:
The rougher-finisher knuckle pattern is divided into two separate flute groups consisting of opposing flutes; long tooth flutes and short tooth flutes. (Reference to the flute that physically connects to the respective tooth).
Long tooth flute #1: The first knuckle is located 0.070 inch from the end of the end mill or the OD tangent point of a corner radius. The next knuckle follows the 0.135 inch knuckle pitch. This pitch continues for one half of the length of cut +0.075 inch/−0.000 inch.
Long tooth flute #2: The first knuckle is located 0.138 inch from the end of the end mill or the OD tangent point of a corner radius. The next knuckle follows the 0.135 inch knuckle pitch. This pitch continues for one half of the length of cut +0.075 inch/−0.000 inch.
Short tooth flute #1: The first knuckle is located one half of the length of cut from the end of the end mill or the OD tangent point of a corner radius +0.070 inch. The next knuckle follows the 0.135 inch knuckle pitch. This pitch continues for the full length of cut +0.075 inch.
Short tooth flute #2: The first knuckle is located one half of the length of cut from the end of the end mill or the OD tangent point of a corner radius +0.138 inch. The next knuckle follows the 0.135 inch knuckle pitch. This pitch continues for the full length of cut +0.075 inch.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. An end mill comprising:
a shank adapted to be coupled to a rotating support;
at least two flutes extending helically at least partially from an end of the end mill to said shank;
at least two adjacent teeth with one of said at least two flutes therebetween, extending helically from a tip to a root adjacent said shank;
said teeth each including a cutting edge thereon;
each of said teeth having a plurality of notches thereon;
said notches grouped into regions on only a portion of each said tooth, such that each tooth has at least one region with notches thereon and at least one region which is notchless;
a first one of said at least two teeth having a first notch therein, said first notch spaced a first distance from said end;
a second one of said at least two teeth having a second notch therein, said second notch spaced a second distance from said end; and
said first tooth being notchless at said second distance.

2. The end mill of claim 1 wherein said second tooth is notchless at said first distance.

3. The end mill of claim 2 wherein said first tooth includes a plurality of notches, said second tooth being notchless at a distance from said end matching a distance of said plurality of notches on said first tooth.

4. The end mill of claim 3 wherein said second tooth includes a plurality of notches thereon, said first tooth being notchless at a distance from said end matching a distance of said plurality of notches on said second tooth.

5. The end mill of claim 4 wherein a pitch between adjacent notches on said first tooth and said second tooth is constant, with a space between said notches on said first tooth and said second tooth being substantially flat between said notches.

6. The end mill of claim 1 wherein at least one of said notches has a floor with side edges, one of said side edges curving more gradually than the other of said side edges.

7. The end mill of claim 6 wherein a side of said floor of said notch closer to said end of said tooth curves less gradually than a side of said floor closer to said shank.

8. The end mill of claim 7 wherein at least two of said notches on at least one of said teeth have a space therebetween which is substantially flat.

9. A rotating cutting tool, comprising in combination:
a shank adapted to be coupled to a rotating support;
at least two flutes extending helically at least partially from an end of the cutting tool to said shank;
at least two teeth extending helically from a tip to a root adjacent said shank;
said teeth each including a cutting edge thereon;
each of said teeth having a plurality of notches thereon; and
said notches grouped into regions on only a portion of each said tooth, such that each tooth has at least one region with notches thereon and at least one region which is notchless.

10. The tool of claim 9 wherein said at least two teeth include a first tooth and a second tooth, said notchless region of said second tooth located a different distance from said end than said notchless region of said first tooth.

11. The tool of claim 10 wherein said first one of said at least two teeth and said second one of said at least two teeth are adjacent to each other with one of said flutes therebetween.

12. The tool of claim 9 wherein each notch is followed circumferentially by a notchless portion on all other said teeth.

13. The tool of claim 9 wherein at least one of said notches has a floor with side edges, one of said side edges curving more gradually than the other of said side edges.

14. The tool of claim 13 wherein a side of said floor closest to said end of said tooth curves less gradually than a side of said floor closer to said shank.

15. An end mill, comprising in combination:
a shank adapted to be coupled to a rotating support;
at least two flutes extending helically at least partially from an end of the cutting tool to said shank;
at least two teeth extending helically from a tip to a root adjacent said shank;
said teeth each including a cutting edge thereon;
each of said teeth having a plurality of notches thereon;
said notches grouped into regions on only a portion of each said tooth, such that each tooth has at least one region with notches thereon and at least one region which is notchless;
at least one of said cutting edges including at least one notch therein;
at least one of said notches having a floor between two side edges; and
one of said two side edges curving more gradually than the other of said two side edges.

16. The end mill of claim 15 wherein said edge of said at least one notch closer to said tip is less gradual than said edge of said at least one notch located further from said tip.

17. The end mill of claim 16 wherein each of said plurality of notches exhibits a similar cross-sectional shape and size.

18. The end mill of claim 16 wherein at least two of said plurality of notches are spaced apart by a portion of said cutting edge which is flat between said notches.

19. An end mill comprising:
a shank adapted to be coupled to a rotating support;
at least two flutes extending helically at least partially from an end of the end mill to said shank;
at least two adjacent teeth with one of said at least two flutes therebetween, extending helically from a tip to a root adjacent said shank;
said teeth each including a cutting edge thereon;
a first one of said at least two teeth having a first notch therein, said first notch spaced a first distance from said end;
a second one of said at least two teeth having a second notch therein, said second notch spaced a second distance from said end;
said first tooth being notchless at said second distance; and
at least one of said notches followed circumferentially at a common distance from said end of the end mill by a notchless portion on all other said teeth.

20. The end mill of claim 19 wherein each of said notches is followed circumferentially at a common distance from said end of the end mill by a notchless portion on all other said teeth.

21. The end mill of claim 19 wherein each of said notches is located a different distance from said end then all other said notches on the end mill.

* * * * *